United States Patent
Scott et al.

(12)

(10) Patent No.: US 6,333,382 B1
(45) Date of Patent: Dec. 25, 2001

(54) POLYMERIC COMPOSITION, ITS USE FOR THE MANUFACTURE OF OBJECTS AND OBJECTS SO OBTAINED

(75) Inventors: Swanzy Scott, Houston; Kelley Sherwood, Spring, both of TX (US)

(73) Assignee: Solvay Polyolefins Europe-Belgium, Brussels (BE)

( * ) Notice: Subject to any disclaimer, the term of this patent is extended or adjusted under 35 U.S.C. 154(b) by 0 days.

(21) Appl. No.: 09/499,380

(22) Filed: Feb. 7, 2000

(51) Int. Cl.$^7$ .............................. C08L 53/00; C08L 53/02
(52) U.S. Cl. .................... 525/89; 525/98; 525/99
(58) Field of Search .................. 525/88, 89, 98, 525/99

(56) References Cited

U.S. PATENT DOCUMENTS 4,904,731    2/1990    Holden et al. .

FOREIGN PATENT DOCUMENTS

A-2 323 363    9/1998    (GB) .

*Primary Examiner*—Jeffrey Mullis
(74) *Attorney, Agent, or Firm*—Venable; Marina V. Schneller

(57) ABSTRACT

Polymeric composition containing:
a) 100 parts by weight of a random copolymer of propylene and ethylene containing less than 6 weight % of ethylene,
b) 0.1 to 4 parts by weight of an elastomeric block copolymer having at least one polymeric block containing predominantly polymerized monovinyl aromatic compound and at least one polymeric block containing predominantly polymerized conjugated diene, and
c) 12 to 20 parts by weight of an elastic metallocene polyolefin.

Use of said composition for the manufacture of shaped objects and objects so obtained.

7 Claims, No Drawings

POLYMERIC COMPOSITION, ITS USE FOR THE MANUFACTURE OF OBJECTS AND OBJECTS SO OBTAINED

This invention relates to a polymeric composition and more particularly to a polymeric composition based on a random copolymer of propylene. It also relates to the use of said composition for the manufacture of objects and to the objects so obtained.

Random copolymers of propylene are propylene copolymers containing a small amount of ethylene, generally from about 0.5 to about 6 weight %. They are used for applications that require improved clarity over homopolymers polypropylene.

For example, their properties make them attractive for use in the manufacture of food containers. However, like propylene homopolymer, they have a low impact strength, which leads to whitening under minor impact events, a phenomenon commonly known as blushing or hazing. The tendency towards blushing makes the random copolymers of propylene unattractive for certain uses, such as food containers.

In U.S. Pat. No. 4,904,731, it was found that a hydrogenated elastomeric block copolymer comprising at least two polymeric blocks containing predominantly monoalkenyl aromatic hydrocarbon monomer units and at least one block containing a predominantly hydrogenated, conjugated diene unit and a linear low density polyethylene (LLDPE) can be combined with the random copolymers of propylene to improve impact resistance and clarity. However, impact related hazing problems are still seen in this polymer when it is used at low temperature. Therefore, even greater impact resistance and clarity, particularly at low temperatures, was desirable.

In GB-A-2,323,363, it was found that blending a hydrogenated elastomeric block copolymer and an elastic metallocene based polyolefin with random copolymer of propylene provided improved impact strength, particularly low temperature impact strength, and also an excellent clarity. According to the description, the concentration of the elastomeric block copolymer is up to 25 weight %, e.g. 15 weight %, and the concentration of the metallocene based polyolefin is up to 25 weight %; the weight ratio of block copolymer to metallocene based polyolefin being in the range from about 25:75 to 75:25, most preferably 50:50. The drawback of such composition is, beside its relatively high cost, the high concentration of the elastomeric block copolymer that makes the composition unsuitable for packaging applications where FDA "cooking in the bag" compliance is required. Moreover, at very high concentration of elastomeric block copolymer, the composition becomes unacceptable even for simple food contact application. It was therefore desirable to obtain a better balance between mechanical properties and FDA compliance.

New compositions have now been found containing a random copolymer of propylene, an elastomeric block copolymer and LLDPE that meet these objectives.

For this purpose, the present invention relates to a polymeric composition containing:

a) 100 parts by weight of a random copolymer of propylene and ethylene containing less than 6 weight % of ethylene, b) 0.1 to 4 parts by weight of an elastomeric block copolymer having at least one polymeric block containing predominantly polymerized monovinyl aromatic compound and at least one polymeric block containing predominantly polymerized conjugated diene, and c) 12 to 20 parts by weight of an elastic metallocene polyolefin.

The random copolymers of propylene involved in the composition of the invention most often contain from 0.5 to 4 weight % of ethylene. The ethylene content is preferably of at least I weight %; ethylene content of at most 3 weight % giving good results. Random copolymers containing from I to 3 weight % of ethylene are particularly suitable.

The random copolymers of propylene usable in the present invention advantageously contain monomer units derived only from propylene and ethylene.

Such random copolymers of propylene are known by the man of ordinary skill in the art and are generally obtained by any polymerization process of blends of suitable contents of propylene and ethylene.

The ethylene content in the random copolymers is measured by infrared spectrography and estimated from the bands measured 732 and 720 $cm^{-1}$. The random copolymer usable according to the present invention most often have a melt index (MFI), measured at 230° C. under a 2.16 load according to ASTM Standard D 1238 (1986), of 0.1 to 50 g/10 min, in particular from 1 to 50, values from 1 to 10 being the most common because they provide with adequate Theological behavior during the process of blow moulding.

Any block copolymer containing at least one polymeric block containing predominantly polymerized monovinyl aromatic compound and at least one polymeric block containing predominantly polymerized conjugated diene, herein after designated as elastomeric block copolymer, may be used in the compositions of the invention.

According to the present invention, the term predominantly defines an amount of at least 85% by weight. The other portion of monomer may be any monomer copolymerizable with the indicated monomers. Examples of said monomers are α-olefins such as, preferably, ethylene.

Suitable monovinyl aromatic compounds have 8 to 20 carbon atoms such as stryrene and styrene homologues. Styrene is specially preferred.

In most cases, the conjugated diene have 4 to 8 carbon atoms such as for examples 1,3 butadiene (butadiene), 2-methyl-1,3-butadiene and 2-methyl-1,3-pentadiene. Preferred dienes are butadiene and isoprene, butadiene giving the best results.

Copolymers of conjugated diene with a-olefin give good results.

Amongst them copolymers of butadiene and ethylene are specifically preferred.

Moreover, mixture of elastomeric block copolymers may be used such as, for example, mixtures of a diblock copolymer containing one block of polymerized monovinyl aromatic compound and one block of polymerized conjugated diene with a triblock copolymer containing two endblocks of polymerized monovinyl aromatic compound and one midblock of polymerized conjugated diene.

The elastomeric block copolymer for use in this invention is preferably formed from blocks hereabove described and is generally not grafted with functionalized monomers such as for example carboxylic and/or anhydride or sulphonate.

Typically, the elastomeric block copolymer is a styrene/ethylene-butadiene/styrene triblock copolymer or a mixture thereof with styrene/ethylene-butadiene diblock copolymers, these latter being specifically preferred.

Said copolymers are known in the art and may be prepared by sequential anionic polymerization of the monomers using known initiators such as alkyl lithium initiators.

The elastomeric block copolymer used in the composition according to the invention are preferably hydrogenated in order to provide weatherability to the polypropylene composition. The hydrogenation may be carried out by using any known hydrogenation method. In general, the conditions used to said hydrogenation are selected to insure that at least 50%, preferably at least 80% and most preferably at least 95% of the ethylene unsaturations remaining in the conjugated block copolymer are saturated. Usually these conditions are such that less than 20%, most often less than 10% and more particularly less than 5% of the aromatic unsaturations in the monoalkenyl aromatic hydrocarbon polymer blocks are hydrogenated.

The content of elastomeric block copolymer is usually of at least 0.5 and more particularly of at most 3 parts by weight per 100 parts of random copolymer of propylene.

Contents of from 0.5 to 2 parts by weight per 100 parts of random copolymer of propylene makes it possible to reach particularly advantageous properties at reasonable costs.

Beside the random copolymer of propylene and the elastomeric block copolymer, the composition of the invention contains from 12 to 20 parts of an elastic metallocene polyolefin per 100 parts of random copolymer of propylene.

Any random copolymer of ethylene containing less than 20% by weight of an α-olefin having 3 to 10 carbon atoms made using a metallocene catalyst may be used as elastic metallocene polyolefin. Copolymers of ethylene containing less than 10% by weight of α-olefin containing 4 to 8 carbon atoms are preferable and amongst them ethylene/butene copolymers having a density of at most 0.920 are particularly suitable. Metallocene ethylene-butene copolymers having a density lower than 0.890 will result in a polymer with excellent low temperature toughness, but not enough rigid for hot fill applications. Accordingly ethylene-butene copolymer having a density of 0.890 to 0.910 are the most suitable.

Most often the elastic metallocene polyolefin is added in proportions of from 14 to 18 parts by weight for 100 parts of random copolymer of propylene.

Moreover the weight ratio of the elastic metallocene polyolefin to the elastomeric block copolymer is generally of 5:1 to 20:1, most preferably 10:1 to 15:1.

The compositions according to the invention provides sufficiently improved impact strength, while maintaining top load resistance, flexural modulus and heat deflection suitable for blow moulding application and while limiting the extractable to a level in compliance with Food and Drugs Administration (FDA) regulations concerning food contact and "cooking in the bag". They are suitable for the blow molding of containers that will be used in a "hot fill" application. The FDA extractable fraction (FDA ext) of the composition according to the invention, measured as described herein after, is advantageously lower than 3% by weight and more preferably lower than 2.5% by weight when application of "cooking in the bag" are desired.

The compositions according to the present invention may also contain usual additives such as stabilizers (for example antiacids, antioxidants and/or anti UV), organic or inorganic colorants (such as for example, titanium or iron oxides), moulding releasing agents or antistatic agents. The content of each of the additives is generally less than 10 parts, more particularly less than 1 part by weight per 100 parts by weight of the random copolymer of propylene. In general, the moulding releasing agent concentration will not exceed 0.2% by weight of the total composition, typically not 0.15% by weight. A suitable concentration is 0.12%w.

The compositions containing two antioxidants and one moulding releasing agent are particularly suitable because they provide with the right balance of long term oxidative stability, processing thermo-oxidative stability and ease of removal from the mold in the blow moulding process, insuring therefore proper rate of production of the containers.

The composition according to the invention may be obtained by any suitable means, for example by mixing the components and the optional additives at ambient temperature, followed by mixing them in the molten state, for example in a mechanical mixer or in an extruder. Most often the temperature of the molten phase mixing is of about 140° C. to about 270° C. Higher and lower temperatures may be operable.

The polymer composition of this invention may be used in any of the applications known for the polyolefins so as for example production of manufactured shaped objects of propylene polymer. Therefore the composition may be processed by any of the conventional processes such as for example extrusion, blow extrusion, extrusion thermoforming and injection moulding.

Due to the excellent compromise of impact strength, top load resistance, flexural modulus, heat distortion and FDA compliance, a particular use is the blow molding of food containers that will be hot filled.

Consequently the present invention also relates to the use of the composition according to the invention for the manufacture of shaped objects, in particular food containers, and to the objects so obtained.

The examples whose description follows serve to illustrate the invention. Example 1 is carried out according to the invention while examples 2R and 3R are given by way of comparison. The meaning of the symbols employed in these examples, the units expressing the properties and the methods of measurement of these properties are detailed below.

MFI=Melt index of the random copolymer of propylene, measured at 230° C. under a 2.16 kg load according to ASTM Standard D 1238 (1986)

Flex mod=Flexural modulus, measured at 1% secant, according to ASTM Standard D 790 and expressed in psi Def=Heat deflection temperature measured at 66 psi according to ASTM Standard D 648 and expressed in ° C.

FDA ext=Fraction of the composition extractable by hexane at a temperature of 68° C. as measured according to FDA, title 21, paragraph 177, 1520 (d)(3)(ii)(i) and expressed in % by weight En=Energy at maximum load, measured respectively at 23° C. and −30° C. according to ISO 6603-2 and expressed in ft*lbf Enf=Energy at failure measured respectively at 23° C. and −30° C. according to ISO 6603-2 and expressed in ft*lbf Due=Ductility measured respectively at 23° C. and −30° C. according to ISO 6603-2 and expressed in %

Defl=Deflection measured respectively at 23° C. and −30° C. according to ISO 6603-2 and expressed in inches

EXAMPLE 1

A mixture containing:

100 parts by weigh of a random copolymer of propylene containing 2.05 weight % of ethylene and having a MFI of 1.9, 1.2 parts by weight of a hydrogenated elastomeric block copolymer comprising 30 weight % of a hydrogenated diblock copolymer of styrene/ethylene-butadiene and 70% by weight of a hydrogenated triblock copolymer of styrene/ethylene-butadiene/styrene commercialized under the name of KRATON® G 1657 by SHELL, 16.5 parts by weight an elastic metallocene polyolefin consisting in an ethylene-butene copolymer whose density is 0.900 commercialized under the name of EXACT® SLX 9106 by EXXON, 0.14 parts by weight of glycerol monostearate, 0.12 parts by weight of a primary antioxydant of the phenolic type (Ethanox 330), 0.05 parts by weight of a secondary antioxydant of the organophosphorus type (Irgafos PEPQ), and 0.06 parts by weight of calcium stearate is dry blended in a Henschel mixer and fed in a ZSK 40 twin extruder working at temperature of 240° C. with a screw rotation of 195 rpm.

The properties of the obtained composition are disclosed in Table 1 hereunder.

EXAMPLES 2R AND 3R

Two compositions were obtained as disclosed in example 1 except that the content of elastic metallocene polyolefin is 8.9 parts (example 2R) or 1.2 (example 3R) parts while those elastomeric block copolymer is 8.9 parts (example 2R) or 16.5 parts (example 3R).

The properties of the obtained compositions are set forth in Table 1 hereunder

TABLE 1

| example | 1 | 2R | 3R |
|---|---|---|---|
| En (23° C.) | 14.7 | 14.6 | 13.9 |
| Defl (23° C.) | 0.51 | 0.52 | 0.53 |
| Enf (23° C.) | 25.1 | 24.5 | 23.4 |
| Duc (23° C.) | 41.5 | 40.5 | 40.8 |
| En (−30° C.) | 6.43 | 1.49 | 17.9 |
| Defl (−30° C.) | 0.28 | 0.17 | 0.47 |
| Enf (−30° C.) | 7.53 | 1.7 | 29.9 |
| Duc (−30° C.) | 14.6 | 12.4 | 40.1 |
| Def | 73.5 | 74.8 | 70.5 |
| Flex mod | 129000 | 121000 | 109000 |
| FDA ext | 1.7 | 2.7 | 10 |
| food contact acceptance | acceptable | acceptable | non acceptable |
| cooking in the bag acceptance | acceptable | questionable | non acceptable |

As can be seen, only the composition according to the invention offers an acceptable balance of mechanical properties and FDA acceptability while composition 2R lacks mechanical properties at low temperature and becomes questionable as far as "cooking in the bag" and composition 3R, offering the best impact strength at low temperature, is totally unacceptable for FDA applications and lacks modulus for hot fill application.

What is claimed is:

1. Polymeric composition comprising:

a) 100 parts by weight of a random copolymer of propylene and ethylene containing less than 6 weight % of ethylene;

b) 0.1 to 4 parts by weight of an elastomeric block copolymer having at least one polymeric block containing predominantly polymerized monovinyl aromatic compound and at least one polymeric block containing predominantly polymerized conjugated diene; and c) 12 to 20 parts by weight of an elastic metallocene polyolefin, wherein the weight ratio of the elastic metallocene polyolefin to the elastomeric block copolymer ranges from 5:1 to 20:1.

2. The composition according to claim 1, wherein the random copolymer of propylene contains from 1 to 3 weight % of ethylene.

3. The composition according to claim 1, wherein the elastomeric block copolymer is a styrene/ethylene-butadiene/styrene triblock copolymer or a mixture thereof with styrene/ethylene-butadiene diblock copolymer.

4. The composition according to claim 1, wherein the elastic metallocene polyolefin is an ethylene-butene copolymer having a density of 0.890 to 0.910 made using a metallocene catalyst.

5. The composition according to claim 1, wherein the weight ratio of the elastic metallocene polyolefin to the elastomeric block copolymer ranges from 10:1 to 15:1.

6. A food container manufactured from the composition of claim 1.

7. Shaped objects manufactured from the composition according to claim 1.

* * * * *

UNITED STATES PATENT AND TRADEMARK OFFICE
CERTIFICATE OF CORRECTION

PATENT NO.    : 6,333,382 B1
DATED         : Demcember 25, 2001
INVENTOR(S)   : Swanzy Scott and Kelley Sherwood It is certified that error appears in the above-identified patent and that said Letters Patent is hereby corrected as shown below:

Column 1,
Lines 39 and 40, "the clastomeric block copolymer" should read -- the elastomeric block copolymer --
Lines 49 and 50, "clastomeric block copolymer" should read -- elastomeric block copolymer --

Column 2,
Line 6, "at least I weight %;" should read -- at least 1 weight %;"
Line 8, "I to 3 weight % of" should read -- 1 to 3 weight % of --
Line 24, "Theological behavior during the" should read -- rheological behavior during the --
Line 44, "diene with a-olefin give" should read -- diene with α-olefin give --

Column 4,
Line 54, "Due=Ductility measured" should read -- Duc=Ductility measured --

Signed and Sealed this

Eighteenth Day of June, 2002

*Attest:*

*Attesting Officer*

JAMES E. ROGAN
*Director of the United States Patent and Trademark Office*